US005743544A

United States Patent [19]

Weaver

[11] Patent Number: 5,743,544

[45] Date of Patent: Apr. 28, 1998

[54] WHEELCHAIR DRIVE SYSTEM WITH RATCHET AND WHEEL LOCK

[76] Inventor: Michael J. Weaver, 105 Airport Rd., Lot 145, St. Simons Island, Ga. 31522

[21] Appl. No.: 656,105

[22] Filed: May 31, 1996

[51] Int. Cl.[6] .......... B62M 1/14

[52] U.S. Cl. .......... 280/249; 280/250.1; 297/DIG. 4; 188/2 F; 74/384; 74/405

[58] Field of Search .......... 280/249, 250.1, 280/304.1; 297/DIG. 4; 74/384, 405; 188/2 F, 82.1, 82.3, 82.5

[56] References Cited

U.S. PATENT DOCUMENTS

| | | | |
|---|---|---|---|
| 3,563,568 | 2/1971 | Sasse et al. | 280/230 |
| 4,274,650 | 6/1981 | Gilles | 280/249 X |
| 4,727,965 | 3/1988 | Zach et al. | 192/6 A |
| 5,037,120 | 8/1991 | Parisi | 280/250.1 |
| 5,160,156 | 11/1992 | Menoon | 280/250.1 |
| 5,211,414 | 5/1993 | Galumbeck | 280/250.1 |
| 5,236,398 | 8/1993 | Barnett | 474/149 |
| 5,301,971 | 4/1994 | Brereton | 280/250.1 |
| 5,362,081 | 11/1994 | Beidler et al. | 280/250.1 |

*Primary Examiner*—Andrew C. Pike

[57] ABSTRACT

An improved wheelchair wheel and hub assembly is described that interposes reduction gearing between the handring or rotatable hand wheel and the drivewheel of the assembly. This gearing provides some mechanical advantage to users who may lack sufficient strength to propel themselves in a conventional wheelchair, especially in a home environment. A single speed assembly is described which is operated conventionally by rotating handrings either forward or rearward to produce a corresponding rotation of the drive wheel but, unlike conventional wheels, a complete revolution of the handring results in only a partial revolution of the drive wheel. In the hub of the assembly is a wheel locking mechanism which enables the wheel to be easily and positively locked for the safety of the user, preventing rotation of the wheel in either direction. Additionally, a ratcheting mechanism is incorporated into the hub design which can be engaged to allow forward rotation but prevent rearward rotation of the drive wheels.

12 Claims, 4 Drawing Sheets

WHEELCHAIR DRIVE SYSTEM WITH RATCHET AND WHEEL LOCK

BACKGROUND

1. Field of Invention

This invention relates to wheelchair drive systems, specifically to manual drive systems that provide some mechanical advantage for the user of the wheelchair.

2. Description of Prior Art

The traditional wheelchair was designed primarily as a vehicle to be pushed by an attendant for the purpose of moving disabled individuals from one point to another. Minimal attention was given to the wide range of needs and abilities of those in the chairs. This is especially true with regard to the drive system for these chairs whereby handrings attached to the drive wheels are rotated to move the wheelchair. Mobility is dependent upon having the strength to turn the handrings.

For an individual to get into or out of a wheelchair safely, it is essential for the wheels to be locked. The conventional wheelchair wheel lock or parking brake is a lever activated fricition device which forces a bar against the tread of the tire to prevent wheel rotation. The degree to which the wheel is locked is directly proportional to the amount of force that can be applied to the lever. Those lacking sufficient strength must have the wheels locked by an attendant. Also, the location of these friction devices on the frame of the wheelchair can sometimes make them difficult to reach.

A problem also exists when the conventional wheelchair is pushed or driven up an incline. The tendancy of the chair to roll back down the incline requires that it be pushed constantly or it requires that the handrings be held firmly to prevent this. The conventional wheelchair has no device that will allow forward rotation but prevent rearward rotation of the wheel allowing the chair to be ratcheted up the incline.

The invented wheelchair drive system uniquely solves these problems by combining a gear reduction drive system, a wheel locking mechanism easily reached by either the occupant of the chair or an attendant, and an engageable ratcheting mechanism within the hub of a wheelchair wheel. The invented wheelchair drive system presents an alternative for mobility and independence to those who might otherwise need an attendant.

Fortunately, there is a growing recognition that all wheelchair users do not have the same needs and abilities and that all wheelchairs, therefore, need not be of the same design. Numerous designs are known for wheelchairs and features, some of which might be grouped into the following general categories.

(a) multispeed or plural speed wheel hubs for wheelchair wheels that give the occupant some mechanical advantage over traditional designs, that is, greater ease in turning the handring but resulting in slower travel speed, for example, U.S. Pat. Nos. 5,362,081 to Beidler et al. (1994), 5,160,156 to Mendon (1992), 4,727,965 to Zach et al. (1988), and 3,563,568 to Sasse et al. (1971).

(b) various other wheelchair driving devices that give some mechanical advantage to the occupant, for example, U.S. Pat. Nos. 5,236,398 to Barnett (1993), 5,211,414 to Galumbeck (1993), 5,184,837 to Alexander (1993), 5,037,120 to Parisi (1991), 4,762,332 to Seol (1988), 4,758,013 to Agrillo (1988), and 4,274,651 to Dumond (1981).

(c) a ratcheting wheelchair hub that allows free rotation of the drive wheels forwardly but prevents rearward rotation, for example, U.S. Pat. Nos. 5,301,971 to Brereton et al. (1994).

(d) various designs for electrically driven wheelchairs, for example, U.S. Pat. Nos. 5,351,774 to Okamoto (1994), 5,197,559 to Garin et al. (1993), and 5,156,226 to Boyer et al. (1992).

Each of these inventons has disadvantages and/or limitations:

(a) those designs involving multispeed or plural speed hubs and shifting mechanisms may incorporate a coasting function (Mendon), a freewheel (Zach), or cable operated shifting mechanism (Beidler) all of which have the potential to disconnect the handring from the driven wheel should a failure occur in the linkage, resulting in a partial or total loss of control of the wheelchair, that is, the ability to move, turn, or stop. Beidler's design utilizing cables to activate the shifting mechanisms of each wheel seems especially prone to failure inasmuch as both cables must be tensioned identically at all times for the system to operate safely. It is also questionable whether an individual who requires some mechanical advantage to propel himself/herself in a wheelchair due to the lack of strength or impairment of function would have need of a wheelchair with multiple speeds at all, especially in light of the difficulty involved in activating some of these shifting, coasting, and freewheeling devices. Additionally, these devices are expensive to produce in limited numbers.

(b) those designs that provide mechanical advantage to the occupant of the wheelchair in other ways, for example, through the use of chains and sprockets or gears attached to the frame and wheels of the chair, appear to be difficult to operate in some cases and might in other cases make the wheelchair unstable by raising the center of gravity (Galumbeck). Additionally, some of these designs appear to be difficult to keep clean and operable given the exposed ring gears on the wheels (Galumbeck) and (Parisi). The potential also exists (Galumbeck) and (Parisi) for the occupant of the chair or an article of clothing to become entangled in the drive mechanism.

(c) many patents speak of braking functions, referring to the slowing and/or stopping of a moving wheelchair, but none mention the need to lock the wheels for safety nor is there any device shown which would accomplish this. It is assumed, therefore, that all are using the conventional friction brake to lock the wheels on their wheelchair designs, or it may be that thought has not been given to how this might be accomplished.

(d) electrically operated wheelchairs give mobility to disabled individuals but are costly, and might not be considered suitable for use in the average home due to their size and weight. They also require specialized service and repair facilities.

(e) the design for a ratcheting wheelchair hub (Brereton) recognizes the need for a ratcheting mechanism in a wheelchair design but does not provide any mechanical advantage for the user.

OBJECTS AND ADVANTAGES

Accordingly, several objects and advantages of the present invention are:

(a) to provide a wheelchair wheel and hub assembly that gives some mechanical advantage to the user of the wheelchair, that is, a mechanism that allows the handrings to be turned with greater ease but resulting in less speed than would be the case with a conventional wheelchair wheel;

(b) to provide a wheelchair wheel and hub assembly that can be retrofitted to existing, conventional wheelchairs;

(c) to provide a wheelchair wheel and hub assembly that can be easily manufactured;

(d) to provide a single speed mechanism that is easily maintained and requires no adjustment to keep it functioning safely;

(e) to provide a positive wheel locking mechanism that can be fully engaged with minimal effort;

(f) to locate the means of activating the wheel locking mechanism in such a way that it is easily accessible to either the person in the wheelchair or to an attendant;

(g) to provide a ratcheting mechanism within the wheelchair wheel that can be engaged to assist the individual in the wheelchair or an attendant when climbing inclines; and (h) to provide a means whereby the drive mechanism can be disengaged by an attendant, for the purpose of allowing the wheelchair to be pushed without the resulting rotation of the handrings.

Further objects and advantages are to provide a lightweight solid wheel, as opposed to the conventional spoked wheel, that can be varied in color or composition and can provide a surface on which custom designs can be drawn, and so forth. Still further objects and advantages will become apparent from a consideration of the ensuing description and drawings.

DRAWING FIGURES

FIG. 1 shows the invented wheel as it would appear attached to a conventional wheelchair frame. Both left and right wheels are shown. The right wheel is a mirror image of the left wheel.

Reference Numerals In Drawings

Figure 1:
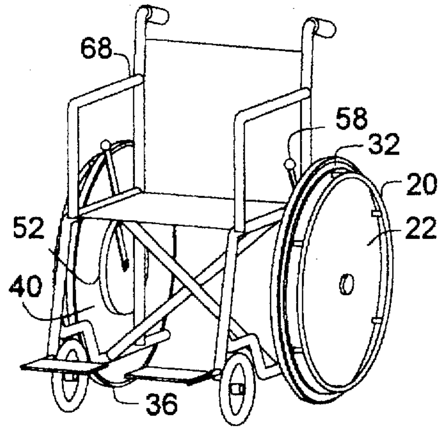

| | |
|---|---|
| 20 handring | 22 outer wheel |
| 23 driver assembly | 24 hub cap |
| 26 driver bolt | 28 washer |
| 30 locking nut | 32 drive wheel |
| 34 ball bearing | 35 drive wheel assembly |
| 36 tire | 38 driver |

-continued

Reference Numerals In Drawings

| | | |
|---|---|---|
| 40 internal ring gear | 42 supporting gear | |
| 44 ratchet gear | 46 drive engagement gear | |
| 48 wheel lock | 49 guide pin | |
| 50 post | 52 mounting ring | |
| 53 backing plate | 54 post | |
| 55 post | 56 shifting disk | |
| 57 mounting structure | 58 lever | |
| 60 shifting quadrant | 62 post | |
| 64 lever | 66 axle | 68 wheelchair frame |

DESCRIPTION

FIGS. 1, 2, 3, AND 4

A typical embodiment of the wheelchair wheel of the present invention is illustrated in FIG. 1 which shows the present invention attached to a conventional tubular wheelchair frame 68 with seat and back supports, footrests, and small front swivel wheels attached. Anyone skilled in the art would recognize this conventional frame and also appreciate that the right wheel shown in FIG. 1 is a mirror image of the left wheel which is shown in all of the other figures. It will be further understood that the present invention can be retrofitted to existing wheelchairs or may be offered in an accessory kit form for that purpose in which case special clamps and/or bolts or other means of attachment would be included which are not shown in the drawn figures.

Figure 2:
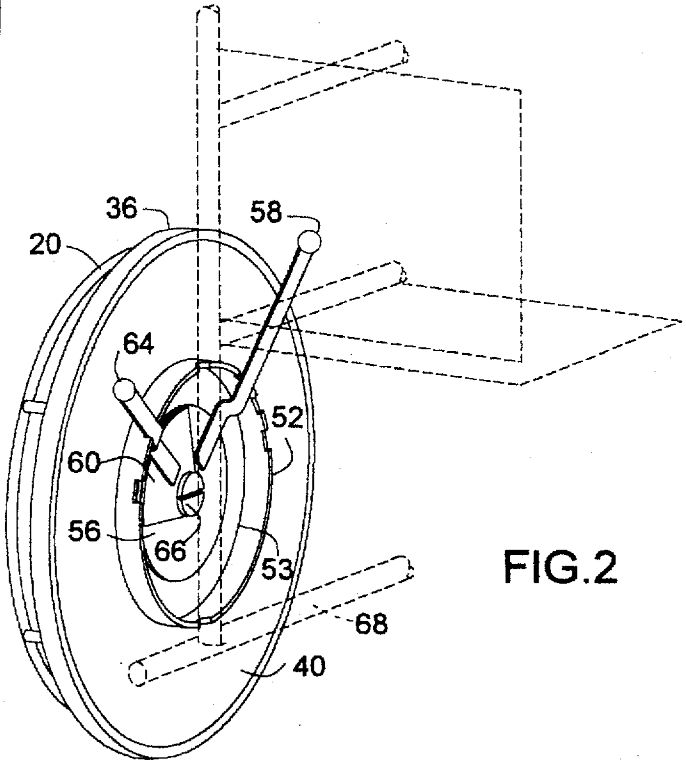
FIG. 2 shows the back side of the invented left wheel.

As shown in FIG. 2, a mounting ring 52 is rigidly attached to the wheelchair frame 68 by any convenient method in such a way that it cannot be rotated or otherwise moved. The mounting ring 52 has three notches cut in the front edge which will accept a lever 58 and lock it into one of three operating positions. The mounting ring 52 also has two notches cut in the back edge which will accept a lever 64 and lock it into one of two operating positions. Lever 58 is rigidly attached to a shifting disk 56 and lever 64 is rigidly attached to a shifting quadrant 60. Both levers are offset to align with the notches in the mounting ring when the unit is assembled. This mounting ring, in addition to being the point at which the present invention is attached to the wheelchair frame, also provides an offset to maintain clearance between the frame and a tire 36 and provides a rigid mounting point for an axle 66 around which the invented drive system rotates. Additionally ,as seen in FIG. 2, the mounting ring provides a means by which the shifting mechanism can be locked in various operating positions and it also protects the shifting assembly.

Figure 4:
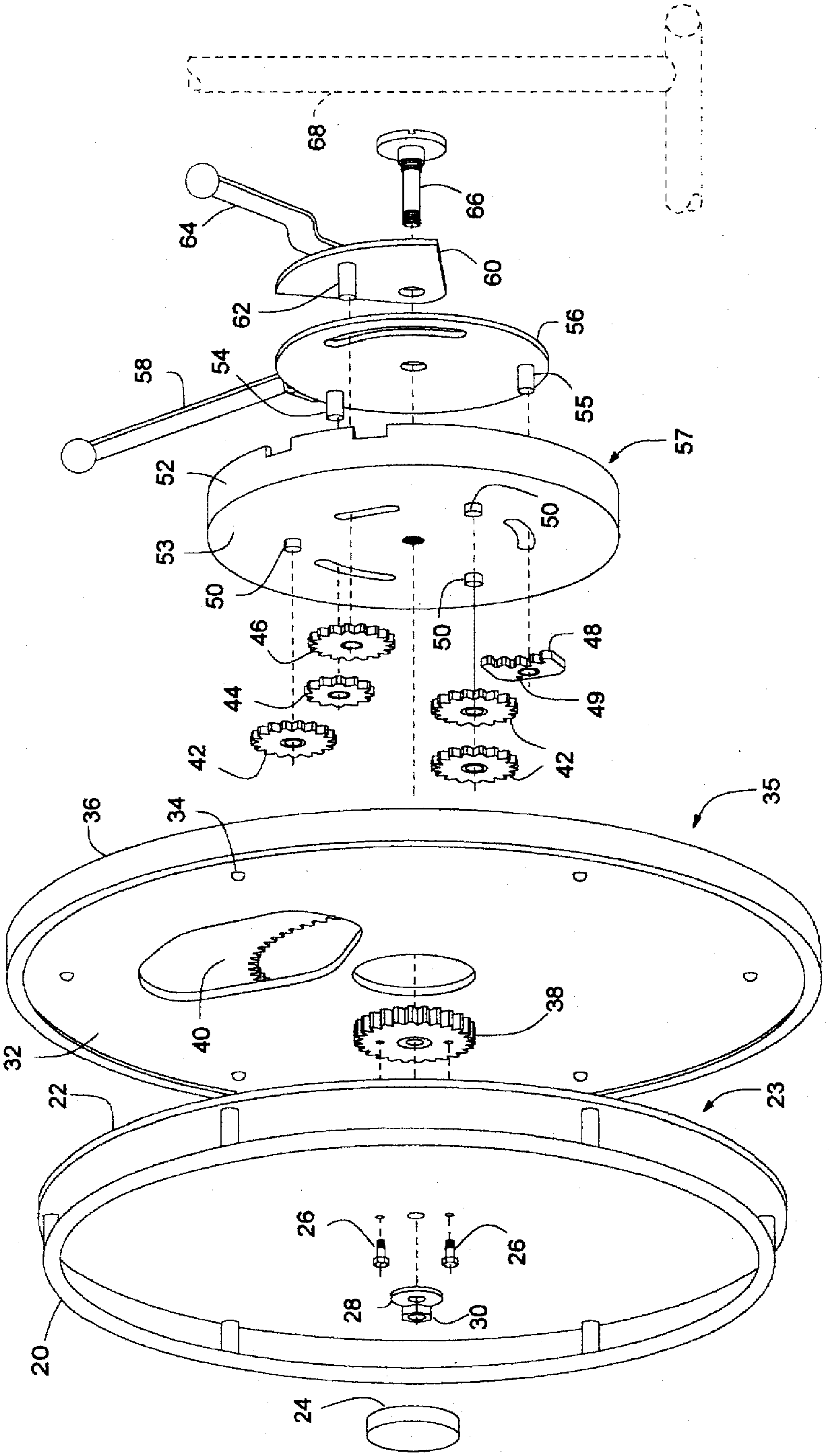
FIG. 4 is an exploded view of the invented wheel shown in FIGS. 2 and 3.

FIG. 4 shows a backing plate 53 rigidly attached to the edge of or formed as part of ring 52, together forming a mounting structure 57, into which are solidly fitted posts 50 onto which are pressed supporting gears 42 with their bearings. Three slots are cut in plate 53 to allow a post 54, a post 55, and a post 62 to communicate with a ratcheting gear 44, a nonrotating wheel lock 48, and a drive engagement gear 46, respectively. The shifting disk and the shifting quadrant are designed in such a way that the slots in plate 53 remain covered at all times to minimize contamination of the drive system by dirt, etc. The slot through which post 55 communicates with wheel lock 48 also provides a channel into which a guide pin 49, one end of which is pressed into wheel lock 48, is fitted, thereby maintaining the alignment of the wheel lock. The axle 66 is passed through the shifting quadrant 60 and the shifting disk 56 from the frame side of the assembly, and threaded securely into a hole in the center of plate 53. This axle has a shoulder which permits it to be tightly threaded into the plate and provides a surface on which the shifting disk 56 and the shifting quadrant 60 can freely rotate. The enlarged head on the axle provides additional support to the backs of the shifting disk and the shifting quadrant to insure that these pieces will not flex when levers 58 and 64 are shifted, and insuring that these levers remain locked in their respective notches when the invention is in use. The axle also defines the axis around which a driver 38 rotates and is threaded at the end to accept a locking nut 30 which holds the assembly together. An additional slot is cut into the shifting disk 56 to allow the post 62 to move freely within its limits regardless of the setting of lever 58. The assembly of the mounting ring, backing plate, and shifting mechanism is complete when parts 44, 46, and 48, with their bearings, are pressed onto their respective posts as described above.

Figure 3:
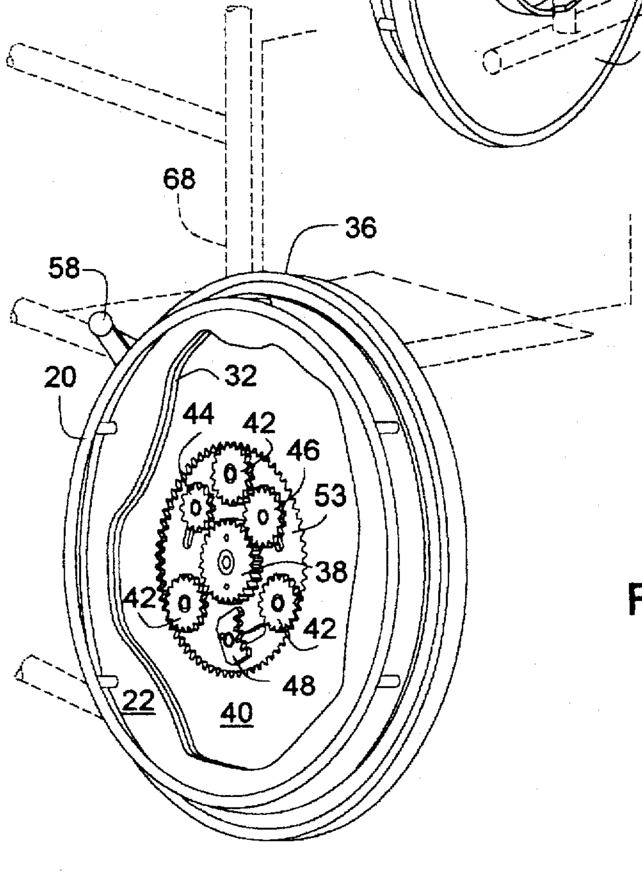
FIG. 3 shows the front side of the same wheel shown in FIG.2, with the outer layers cut away to show the position and arrangement of the drive mechanism, wheel lock, and ratchet components.

As shown in FIG. 3, a drive wheel 32 is bonded to an internal ring gear 40 and covered with a wide profile tire 36 to form a drive wheel assembly 35 which is fitted over supporting gears 42. This drive wheel assembly will now rotate freely around the fixed center of the system, the axle.

FIG. 4 shows a series of radially positioned ball bearings 34 which are set into the face of the drive wheel 32 to allow an outer wheel 22 to turn against it when the invented wheel is assembled. The driver 38, into which a bearing is fitted, is rigidly attached to the outer wheel 22 by bolts 26, and a handring 20 is rigidly attached to the opposite side of the outer wheel, together forming a driver assembly 23. This driver assembly is then fitted over the axle and through a hole in the center of the drive wheel 32. The driver assembly is held in position by a washer 28 and a locking nut 30 which is torqued to a point where the components are held firmly in position but the outer wheel 22 is still free to turn against the drive wheel 32. The washer and nut in turn are covered with a protective hub cap 24.

With respect to materials for forming the above described wheelchair drive system, any suitable materials may be used. The presently preferred material for drive wheel 32, ring gear 40, and outer wheel 22 would be a lightweight, high strength machineable or moldable plastic with the gears being made of nylon or similar material. The mounting ring 52, backing plate 53, axle 66, and all posts as well as the shifting quadrant 60 and shifting disk 56 could be made of aluminum with levers 58 and 64, and handring 20 made of steel.

OPERATION

FIGS. 5, 6, 7, AND 8

In operation, the user of the wheelchair applies rotational force directly to the handrings 20 as is done in a conventional wheelchair, driving the chair forward or backward as desired. The present invention , however, in addition to requiring less force to turn the wheels, gives the user a choice of options depending on the conditions or circumstances encountered.

Figure 5:
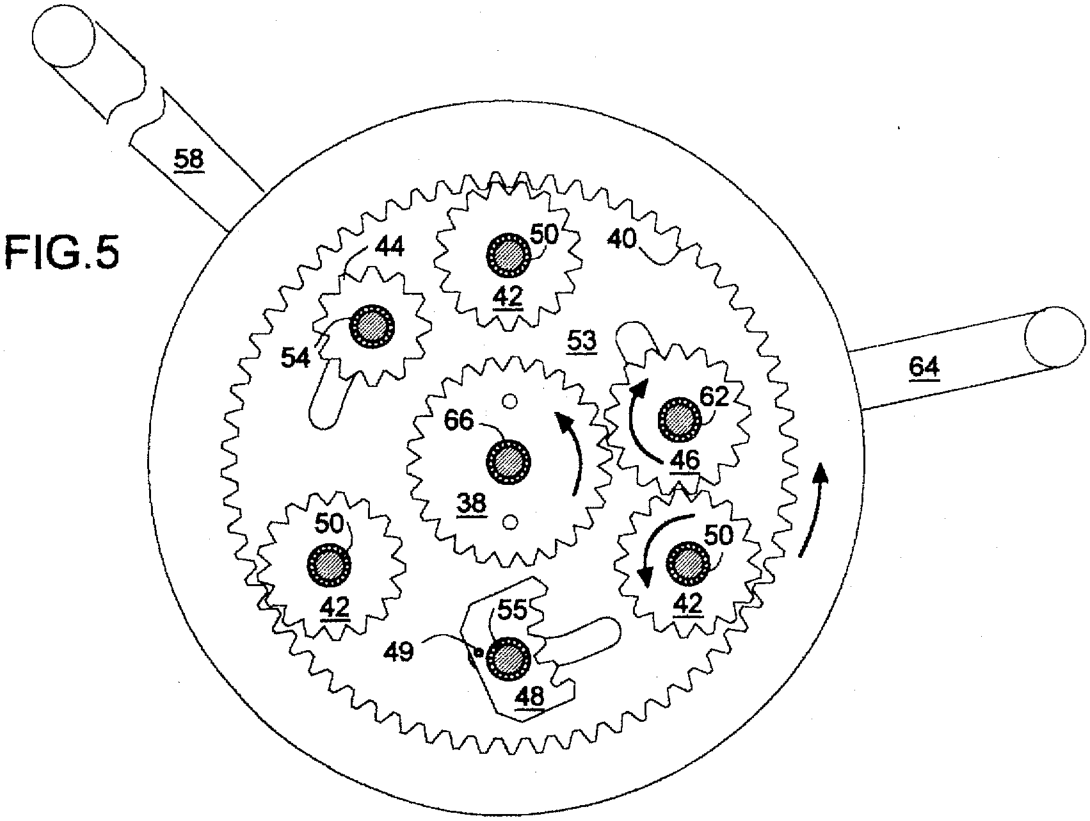
FIG. 5 shows the positioning and direction of rotation of driver and driven components with the drive engaged as it would be in normal use with the brake and ratchet disengaged.

In FIG. 5 will be seen the arrangement and direction of rotation of drive system components as they would be positioned for the user to propel the chair in a conventional manner. Lever 58 is locked into the middle notch on the front edge of mounting ring 52 so neither wheel lock 48 nor ratchet 44 are engaged, and rotational force is applied to the handrings turning driver 38. The driver turns on an axis defined by the axle 66 and in turn drives the drive engagement gear 46 which is locked in position when lever 64 is locked into the lower notch on the back edge of mounting ring 52. The drive engagement gear is positioned to mesh with a supporting gear 42 which turns ring gear 40 which is bonded to and forms part of the drive wheel assembly. The rotational force can be reversed and the drive wheel will turn in the opposite direction. The ratios shown between the sizes of components in these drawn figures represent approximately a four-to-one reduction meaning that the handring is turned four complete revolutions for each complete revolution of the drive wheel. It has been suggested by some that the diameter of the handring could be changed to effect a change in the amount of force required to turn it. While this is theoretically true, it is impractical from an ergonomic standpoint.

Figure 6:
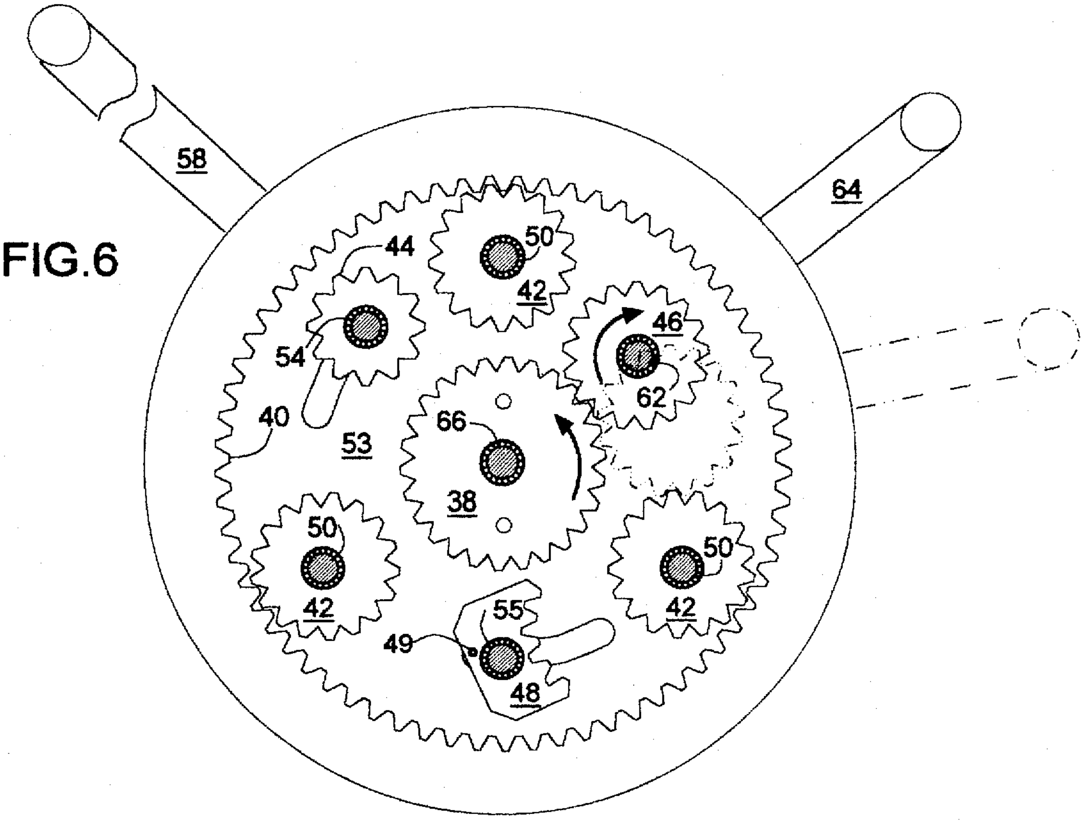
FIG. 6 shows the invented wheel with the drive mechanism disengaged for pushing the wheelchair.

In FIG. 6 the drive engagement gear 46 is disengaged from gear 42 by raising lever 64 and locking it in the upper notch on the back edge of mounting ring 52. This must be done intentionally and can only be done by an individual positoned behind the wheelchair. It cannot be done by the individual in the wheelchair. The purpose of this disengagement is to allow the chair to be pushed without having the handrings rotate at four times the rotational rate of the drive wheels.

Figure 7:
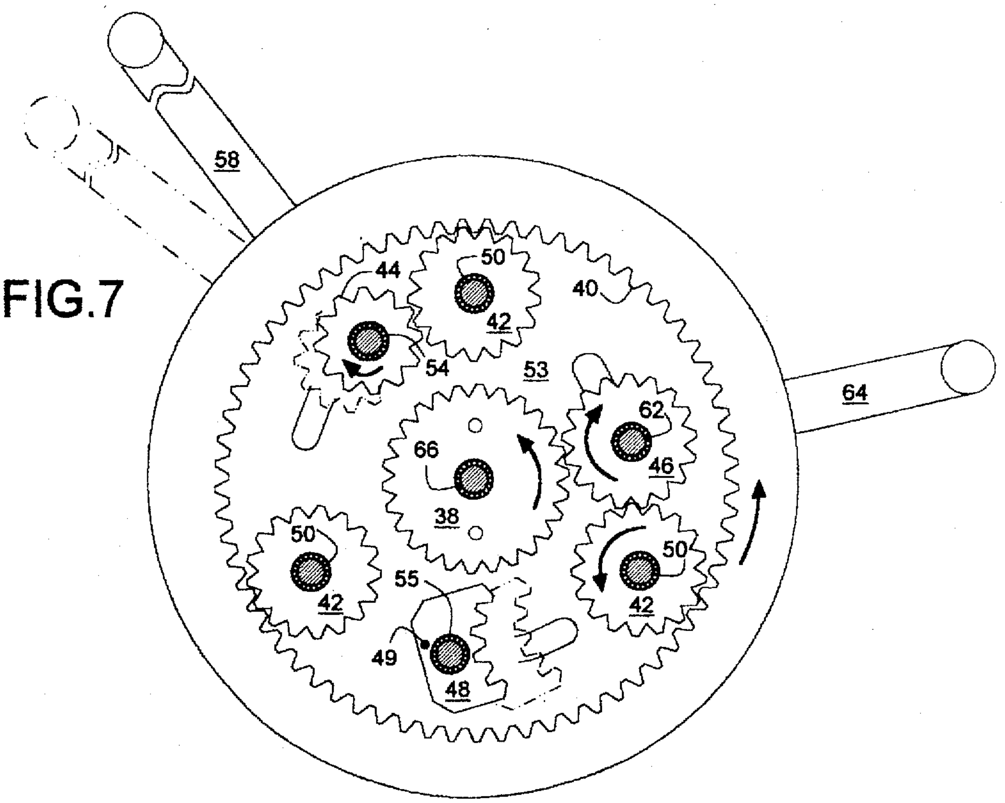
FIG. 7 shows the drive mechanism engaged and the ratcheting gear engaged allowing the drive wheel to rotate in one direction only.

In FIG. 7 the drive mechanism is engaged as it was in FIG. 5 but lever 58 has been raised and locked into the upper notch on the front edge of mounting ring 52. This results in ratcheting gear 44 meshing with upper supporting gear 42 allowing the drive wheel to rotate in only one direction. A detailed drawing of gear 44 is not shown but anyone skilled in the art will appreciate the internal structure of that gear which rotates in only one direction and is prevented from reversing by a pawl and teeth, etc. This ratchet functions whether or not the drive mechanism is engaged, that is, regardless of the position of lever 64, therefore, it functions when an attendant is pushing the chair.

Figure 8:
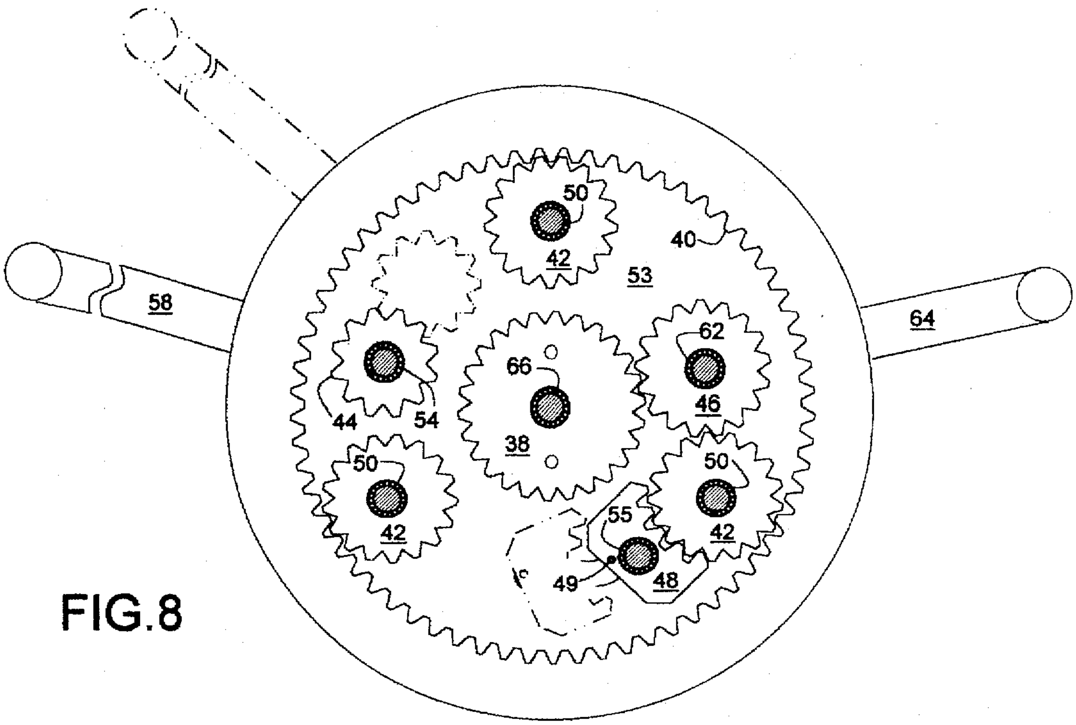
FIG. 8 shows the drive mechanism engaged and the wheel locked preventing wheel rotation in either direction.

FIG. 8 shows the mechanism with the wheel locked. Lever 58 has been moved from its normal position shown in FIG. 5 and is locked into its lower position on the front edge of mounting ring 52. This positoning, close to the plane of the wheelchair seat, minimizes the possibility of accidental disengagement of the lock as the user gets into our out of the wheelchair. When lever 58 is positioned as shown, wheel lock 48 meshes with lower supporting gear 42 preventing rotation of gear 42 and thereby the rotation of ring gear 40 and the drive wheel assembly. It will be noted that guide pin 49 keeps the wheel lock partially aligned when it is not engaged thereby insuring the smooth engagement of the lock with minimal effort. This wheel lock functions whether or not the drive mechanism is engaged.

SUMMARY, RAMIFICATIONS, AND SCOPE

Accordingly, the reader will see that this invention has a number of advantages for an individual who needs some mechanical advantage, especially in their home, to be able to propel themselves in a wheelchair, that is, those persons lacking the strength to propel themselves in a conventional wheelchair. By gaining mobility, this individual may eliminate or reduce the cost or necessity of otherwise having an attendant available to push them from place to place. The reader will also see numerous other advantages of this invention;

there are a minimal number of parts thereby limiting the complexity and subsequent cost of producing the invention in addition to making it easier to install and/or repair. Additionally, many of the parts can be molded rather than machined, which reduces costs;

there is only a single speed available and it is the same whether the chair moves forward or backward. There is no necessity to shift gears making the invented wheel very easy to operate, nor is there any provision for coasting or freewheeling which is viewed as unnecessary and potentially dangerous. All components are solidly linked in such a way that the use of cables, sliding gear clusters, and so forth, are eliminated resulting in a design that requires no adjustment and is easily maintained;

the engageable ratcheting gear permits the chair to be pushed or driven up an incline with less effort and greater safety;

the internal wheel lock is easily engaged and provides a positive means of preventing wheel rotation in either direction for the safety of the user;

the mechanism is enclosed for safety and to minimize contamination;

the profile of the tire is flat and wider than the conventional wheelchair tire, thereby providing better weight distribution and ease of operation in home and other non-institutional environments; and the solid outer wheel provides a surface that can be colored, decorated, and/or otherwise individualized unlike conventional spoked wheels.

Although the description above contains many specifications, these should not be construed as limiting the scope of the invention but as merely providing illustrations of some of the presently preferred embodiments of this invention. For example, the gear ratios may be varied to accommodate the needs of different individuals; a fixed axle might be used in place of separate axles if the invention is to be used on a nonfoldable wheelchair; the positoning within the ring gear of the ratchet, wheel lock, and drive engagement gears may vary; the design of the handring may be modified to accommodate those individuals who have difficulty grasping the conventional handring; and so forth.

Thus the scope of the invention should be determined by the appended claims and their legal equivalents, rather than by the examples given.

I claim:

1. A single-speed geared hub-and-wheel assembly having an axis for use with a manually operated wheelchair vehicle, whereby individuals with limited strength or impairment of function can more easily propel themselves, the assembly comprising:

(a) an axle, defining the axis around which the hub-and-wheel assembly rotates (b) a drive wheel assembly, including a drive wheel, an internal gear, and a tire, said internal gear being supported by a plurality of circumferentially spaced supporting gears (c) a driver, supported on said axle and rigidly connected to a handring, forming a driver assembly which is rotatable forward or rearward by manually rotating said handring; and (d) a drive engagement gear between said driver and said drive wheel assembly.

2. The geared hub-and-wheel assembly of claim 1 further including a nonrotatable entity which can be operationally interposed, by a manually operable shifting assembly, within said geared hub-and-wheel assembly in such a way that rotation of said drive wheel is prevented in either direction.

3. The geared hub-and-wheel assembly of claim 2, further including a unidirectional gear which can be operationally interposed, by the manually operable shifting assembly, within said geared hub-and-wheel assembly in such a way that rotation of said wheel is permitted in one direction but prevented in an opposite direction.

4. The geared hub-and-wheel assembly of claim 3 further including the manually operable shifting assembly which further operationally interposes said drive engagement gear between said driver and said drive wheel assembly.

5. The geared hub-and-wheel assembly of claim 2, further including the manually operable shifting assembly which further operationally interposes said drive engagement gear between said driver and said drive wheel assembly.

6. The geared hub-and-wheel assembly of claim 1 further including a unidirectional gear which can be operationally interposed, by a manually operable shifting assembly, within said geared hub-and-wheel assembly in such a way that rotation of said wheel is permitted in one direction but prevented in the an opposite direction.

7. The geared hub-and-wheel assembly of claim 6, further including the manually operable shifting assembly which further operationally interposes said drive engagement gear between said driver and said drive wheel assembly.

8. The geared hub-and-wheel assembly of claim 1 wherein said drive wheel is constructed of a single material whereby it can be easily manufactured and individualized.

9. The geared hub-and-wheel assembly of claim 8, further including a manually operable shifting assembly which operationally interposes said drive engagement gear between said driver and said drive wheel assembly.

10. The geared hub-and-wheel assembly of claim 1 wherein said tire is flattened cross-sectionally.

11. The geared hub-and-wheel assembly of claim 10 further including a manually operable shifting assembly which operationally interposes said drive engagement gear between said driver and said drive wheel assembly.

12. The geared hub-and-wheel assembly of claim 1, further including a manually operable shifting assembly which operationally interposes said drive engagement gear between said driver and said drive wheel assembly.

* * * * *